May 15, 1928. 1,670,185
J. W. BOND
FISHING LINE ATTACHMENT
Filed June 6, 1927
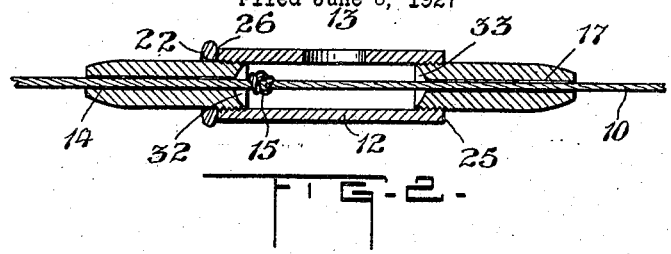
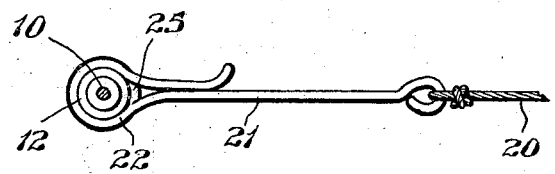
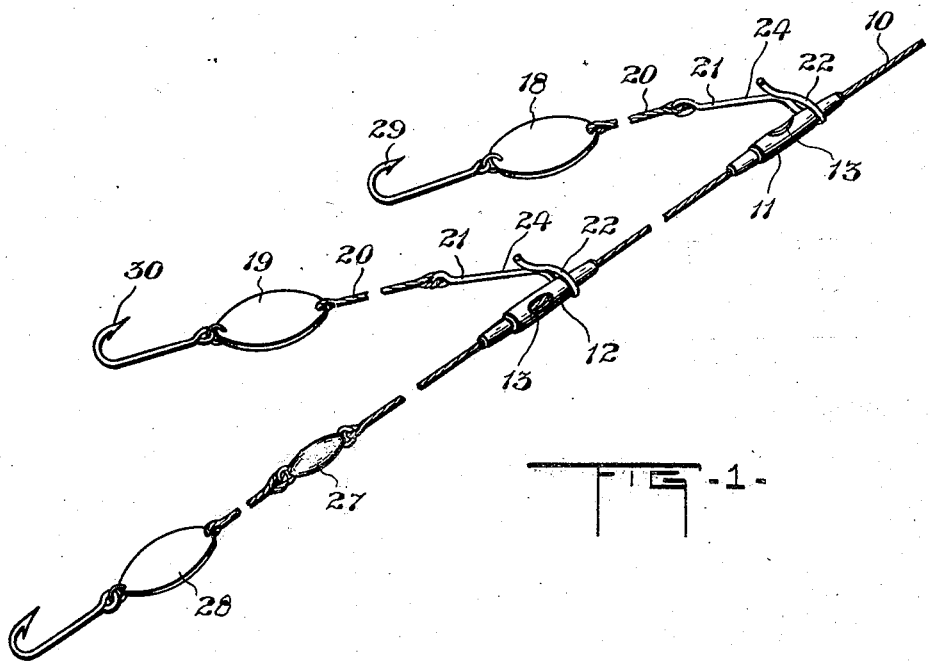
INVENTOR.
JOHN. W. BOND.
BY Fetherstonhaugh & Co.
ATT'YS.

Patented May 15, 1928.

1,670,185

UNITED STATES PATENT OFFICE.

JOHN WILLIAM BOND, OF VICTORIA, BRITISH COLUMBIA, CANADA.

FISHING-LINE ATTACHMENT.

Application filed June 6, 1927. Serial No. 196,927.

This invention relates to improvements in fishing line attachments and more particularly to that class of attachment for fishing lines known as line-stop and the objects of the invention are to provide a simplified device of this description which will expedite and make more practicable and successful the use of additional short line carrying spoons, as commonly attached to main trolling lines. The full and independent action of my improved device will prevent the short line from becoming coiled around or tangled with the trolling line at point of connection, the natural tendency of all main trolling lines being to revolve when in use. Ordinarily, with the short line tied firmly at its position with main line, when the main line revolves the short line is coiled around it. On the instant of a strike and resulting pull, the coil unwinds, and there is not, at the critical moment, any resistance, so that the hook invariably fails to take hold, thus permitting the fish to escape. My improved attachment is to prevent this happening.

Referring now to the drawings, in which like characters of reference indicate corresponding parts in each figure, Figure 1 is a perspective view of my improved device attached to a trolling line with the short lines connected thereto.

Figure 2 is a longitudinal section of the attachment.

Figure 3 is an end view of the device.

Referring more particularly to the drawings, in which a preferred example of my invention is shown, 10 designates the main trolling line provided at spaced intervals with metal stop members 11 and 12, through which the trolling line is threaded. A central orifice 13 is provided in these stops, through which, when the trolling line has been threaded through one end 14 of the stop, it is pulled out to the position required and a knot 15 tied therein, the line being then passed on through and out the other end 17 of the stop (see Figure 2). The spoon baits 18 and 19 are connected by suitable lines 20 to metal snap hook members 21 formed with eyes 22 at their outer ends and adapted at their other ends to embrace in snapped-on position the stops 11 and 12. The shank of the snap is bent as at 24 in the direction of the spoon to prevent the loop of the snap from jamming on the central collar portion 25 of the stop.

It will also be noted that the contact surfaces 26 of the snap are slightly flat to ensure that its position on bearing will be firmer.

The end of the trolling line is connected in the usual way to a sinker 27 with a spoon bait 28.

It will be noted from the foregoing that on a fish striking one of the hooks 29, and 30 resistance will be immediately offered, securely retaining the fish thereon.

By referring to Figure 2 it will be noted that the inner ends of the orifices 14 and 17 are cup-shaped as indicated at 32 and 33 to accommodate the knot 15 of the trolling line.

As many changes could be made in the above construction, and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. In an attachment of the character described for fishing, the combination with the main line, of stop members adapted to engage with said line, and knots formed integral with the line within said stops to limit the travel of the stop on the line, and communicating means formed in the stops for permitting the line to be knotted after engaging with the stops, and bait-carrying snap hooks adapted to detachably engage with the stops.

2. In an attachment of the character described for fishing, the combination with the main line, of stop members adapted to engage with said line, and knots formed integral with the line within said stops to limit the travel of the stop on the line, and communicating means formed in the stops for permitting the line to be knotted after engaging with the stops, and bait-carrying snap hooks adapted to detachably engage with the stops, and means integral with the stops for limiting the travel of the snap hooks on the stops.

In witness whereof I have hereunto set my hand.

JOHN WILLIAM BOND.